United States Patent
Sashihara et al.

(10) Patent No.: US 7,151,922 B2
(45) Date of Patent: Dec. 19, 2006

(54) MOBILE TELEPHONE USING SUBSCRIBER CARD

(75) Inventors: Toshiyuki Sashihara, Tokyo (JP); Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 10/113,561

(22) Filed: Apr. 2, 2002

(65) Prior Publication Data

US 2002/0165008 A1 Nov. 7, 2002

(30) Foreign Application Priority Data

Apr. 3, 2001 (JP) .............................. 2001-104533

(51) Int. Cl.
   *H04M 1/663* (2006.01)
(52) U.S. Cl. ................... 455/412.2; 455/558; 235/441; 709/217; 439/159
(58) Field of Classification Search ............... 455/33.1, 455/89, 54.1, 90, 410, 411, 435, 558, 412.2; 709/217; 235/441; 439/159
   See application file for complete search history.

(56) References Cited

U.S. PATENT DOCUMENTS 5,463,210 A * 10/1995 Imura .......................... 235/441
5,687,216 A * 11/1997 Svensson .................. 455/412.2
6,223,290 B1 * 4/2001 Larsen et al. ................ 713/201
6,398,567 B1 * 6/2002 Nishimura .................... 439/159
6,434,395 B1 * 8/2002 Lubin et al. ................. 455/466
6,707,915 B1 * 3/2004 Jobst et al. .................. 380/247
6,763,249 B1 * 7/2004 Shirai ........................... 455/558
2004/0205155 A1 * 10/2004 Nobakht et al. ............. 709/217

FOREIGN PATENT DOCUMENTS

| JP | S62-007251 A | 1/1987 |
| JP | 2000-308126 A | 11/2000 |

* cited by examiner

*Primary Examiner*—Joseph Feild
*Assistant Examiner*—Pierre-Louis Desir
(74) *Attorney, Agent, or Firm*—Sughrue Mion, PLLC

(57) ABSTRACT

Private data in an EEPROM (14) is erased in a data erasing procedure when pulling out an SIM card (2) from a mobile telephone (1). Before being erased, the private data is encrypted in an encryption procedure and it is transferred and recorded to an external memory (3). The private data encrypted and recorded to the external memory can be reused when the SIM card is used in another mobile telephone. Furthermore, it is possible to prevent the external memory from being left behind when the SIM card is pulled out by interfacing a lock mechanism of a card mounting section (16) with that of a memory mounting section (17).

9 Claims, 10 Drawing Sheets

MOBILE TELEPHONE USING SUBSCRIBER CARD

BACKGROUND OF THE INVENTION

1. Field of the Invention

The present invention relates to a mobile telephone for conducting telephone service by mounting a subscriber card containing a subscriber's identification code stored as a registered identification code. And more particularly, the present invention relates to a mobile telephone capable of preventing a leakage of private information recorded in the mobile telephone using a subscriber card.

2. Related Background Art

Conventionally, there is an SIM (subscriber identification module) card as a subscriber card inserted into a mobile telephone for mounting when it is used. This SIM card is a memory card having identification information (ID), which is equivalent to a subscriber's telephone number registered in an external memory card for registering a telephone number or the like of a mobile telephone, stored by means of an identification code. Write or read operations to or from the SIM card are under the control of a telephone service company. Therefore, normally it is not expected that the card is used for a purpose of storing some information other than ID.

The main part of the mobile telephone is provided with a slot for mounting the SIM card. After the $IM card is inserted into the slot, a call is enabled and a telephone bill is charged to an owner of the SIM card in this mechanism. Therefore, if you carry the SIM card, you can make a call with a charge to yourself by borrowing someone's telephone, if necessary, without carrying around with your own telephone. On the other hand, you can lend someone else your own telephone with a charge to the person using the telephone.

Conventionally, a mobile telephone using this kind of subscriber card generally has a structure as shown in FIG. 1.

A mobile telephone 110, which is shown, can be used with an SIM card 120 inserted for mounting. The mobile telephone 110 comprises a radio communication section 111, a CPU 112, a RAM/RAM 113, an EEPROM 114, a user interface section 115, and a card mounting section 116 connected to a bus 110.

The radio communication section 111 is used for transmitting/receiving to or from a radio base station (not shown) and modulating/demodulating control signals and voice data via a radio circuit and an antenna. The CPU 112 is a central processing unit built in the mobile telephone 110. The ROM/RAM 113 is a section for storing software for controlling the mobile telephone 110 and also a section for securing a work memory required at executing the software.

The EEPROM 114 is a section for storing private data such as a telephone directory, electronic mails, a schedule, and setting information that the user input from the user interface section 115 and the data is not erased even if the power is turned off. Contents of the recorded and stored data are not affected by the card mounting section 116 or the SIM card 120 described later.

The user interface section 115 comprises a liquid crystal display, buttons, and a speaker attached to the mobile telephone. The card mounting section 116 is used for mounting the SIM card 120 by its insertion.

The SIM card 120 for identifying a registered subscriber is a card for storing an ID equivalent to a telephone number and generally has a built-in IC chip.

The above conventional mobile telephone using a subscriber card, however, has a following problem. That is, if the mobile telephone is lent to anyone else, the private information stored in the mobile telephone leaks out completely to a person using the mobile telephone. The reason is that the private information recorded in an internal memory like the EEPROM is kept to be stored as it is unless it is erased by accessing the information sequentially.

SUMMARY OF THE INVENTION

It is an object of the present invention to solve this problem and to provide a mobile telephone capable of preventing a leakage of private data such as a telephone directory or a schedule even in a case of lending someone else the mobile telephone using a subscriber card.

The present invention relates to a mobile telephone using a subscriber card for conducting telephone service by mounting a subscriber card containing a subscriber's identification code. According to one aspect of the present invention, there is provided the mobile telephone, with a procedure for erasing given data stored in an internal memory of the mobile telephone therefrom when the subscriber card is removed after a use of the mobile telephone with the subscriber card mounted.

Generally, when a mobile telephone is used with a subscriber card mounted, private data used by a user such as input data or data acquired at originating or incoming calls is recorded at a given area of the internal memory as the given data. According to the above configuration, however, if a mobile telephone used with a subscriber card mounted is lent to anyone else, removing his/her own subscriber card erases the private information recorded in the internal memory.

In the above configuration, preferably the present invention further comprises a lock mechanism for preventing the fall-out of the mounted subscriber card and a lock release mechanism for instructing a release of the lock by a subscriber's operation. And it has a procedure for detecting the lock release instruction from the lock release mechanism, starting data erasing, and releasing the lock mechanism at a completion of the data erasing, thereby preventing data leakage reliably.

Furthermore, according to another aspect of the present invention, there is provided a mobile telephone using a subscriber card, further comprising an external memory for receiving and recording a transfer of given data with being connected to the mobile telephone. And it has a procedure for transferring and recording the given data in an internal memory of this mobile telephone to the external memory and a procedure for erasing the given data in this internal memory therefrom when the subscriber card is removed after it is mounted and used.

According to this configuration, the private data in the internal memory can be recorded and stored in the external memory and therefore it is possible to save the trouble of settings required at every insertion of the subscriber card by using the external memory.

In addition, in the same manner as for the above, the present invention preferably further comprises a lock mechanism for preventing a fall-out of the mounted subscriber card and a lock release mechanism for instructing a release of the lock by a subscriber's operation. And it has a procedure for detecting the lock release instruction from the lock release mechanism and starting the data transfer from the internal memory. And it further has a procedure for releasing the above lock mechanism at a completion of the data transfer and data erasing. The above procedures are preventing a leakage of given data like private data more reliably and enabling a reliable data storage.

In addition, preferably the data recorded into the external memory is encrypted before the transfer by using a registered identification code of the subscriber card. Furthermore, at the timing of mounting the subscriber card, it is more preferable to read out the registered identification code from the subscriber card while reading out an encrypted identification code recorded into the external memory prepared correspondingly to the subscriber card and decoding it with the registered identification code. And it is more preferable to permit a use of the mounted subscriber card only when the decoded identification code matches the registered identification code.

In addition, at the timing of mounting the subscriber card, it is more preferable to read out the registered identification code from the subscriber card while reading out the data recorded in the external memory prepared correspondingly to the subscriber card and decoding it with the registered identification code and to store the decoded data into the internal memory.

Preferably the external memory is of a mounting type into the mobile telephone like the subscriber card and the mobile telephone further comprises a lock mechanism for preventing a fall-out of each of the mounted external memory and subscriber card and means for detecting the mounting and the fall-out. And it further has a procedure for releasing a lock mechanism of the subscriber card after detecting a removal of the external memory with a release of the lock mechanism of the external memory.

Additionally, even if the external memory is built in the subscriber card or even if it is built in a server of a network to which the mobile telephone is connectable, it is possible to record one of these by specifying a data transfer destination using the subscriber card. Furthermore, the external memory may be built in at least one of the subscriber card, the exclusive memory medium directly inserted into the mobile telephone, and the server of the network to which the mobile telephone is connectable. And therefore, it is also possible to transfer object data in the mobile telephone to the external memory in a given order.

DESCRIPTION OF THE PREFERRED EMBODIMENTS

The preferred embodiments of the present invention will now be described in detail hereinafter with reference to the accompanying drawings.

Figure 1:
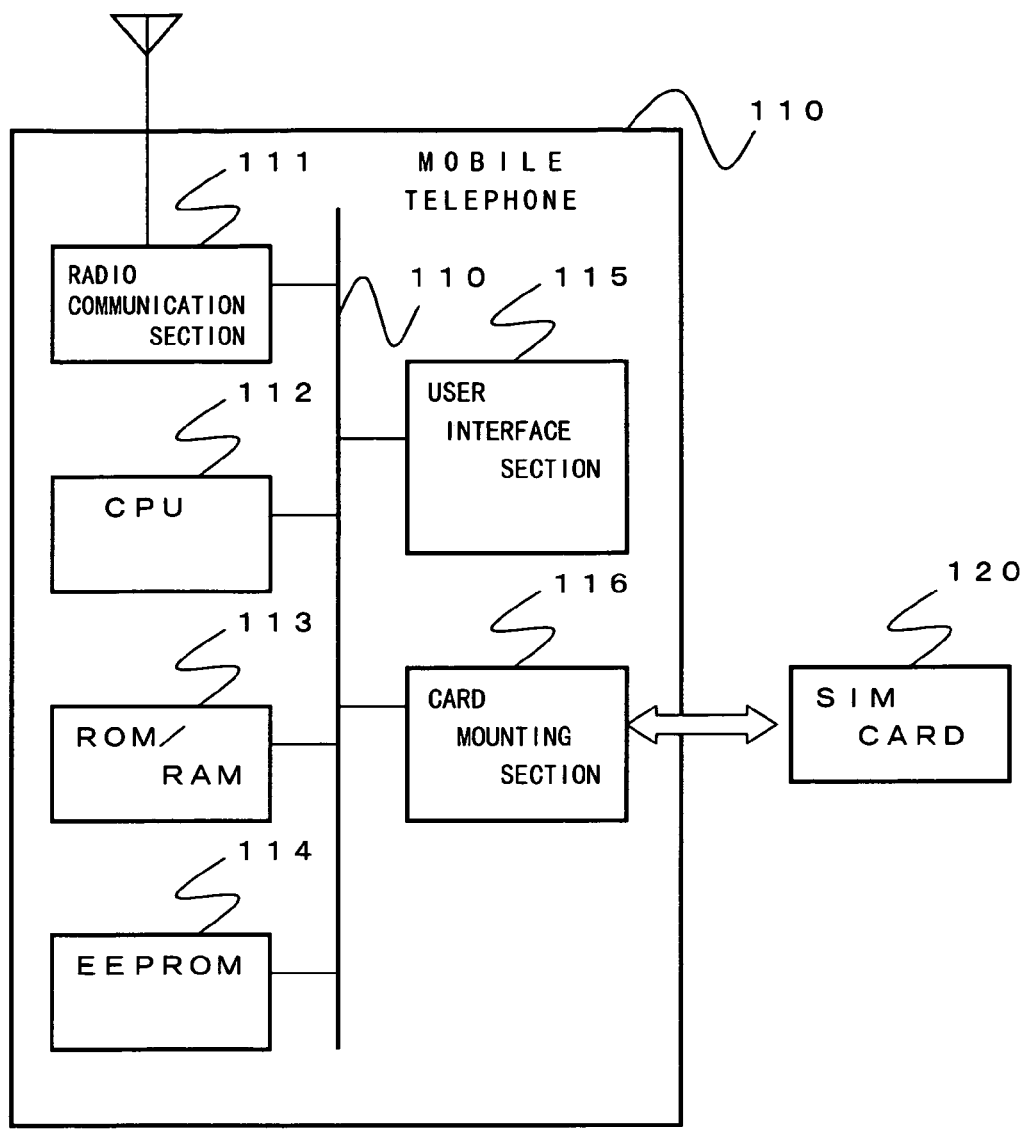
FIG. 1 is a functional block diagram showing an example of a related mobile telephone.
Figure 2:
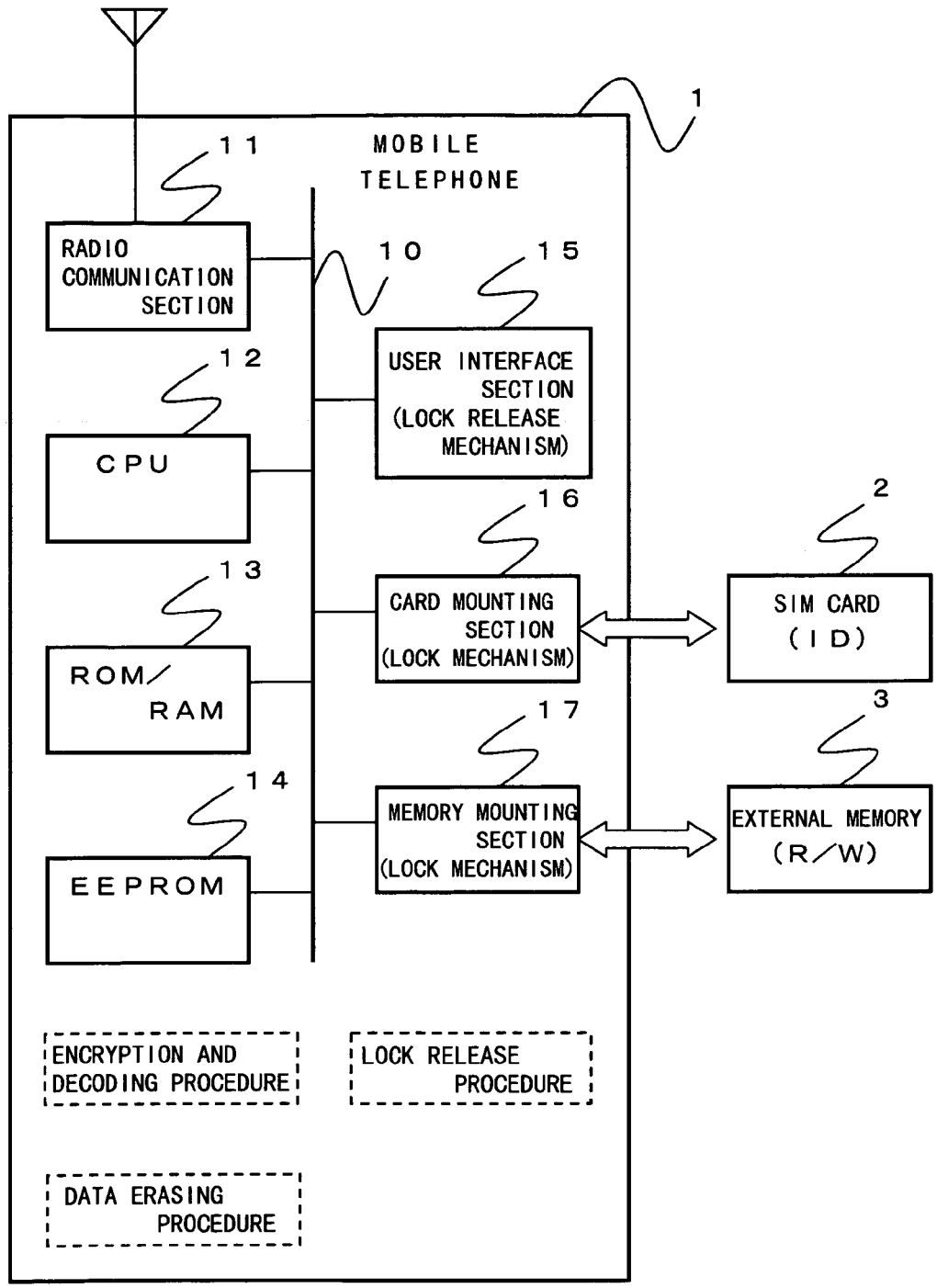
FIG. 2 is a functional block diagram showing an embodiment according to the present invention.

Referring to FIG. 2, there is shown a functional block diagram for an embodiment of the present invention.

A mobile telephone 1 shown in FIG. 2 is assumed to show a telephone function only after a user insert both of an SIM (subscriber identification module) card 2 as a subscriber card and a card-type external memory 3.

The mobile telephone 1 comprises a radio communication section 11, a CPU 12, a ROM/RAM 13, an EEPROM 14, a user interface section 15, a card mounting section 16, and a memory mounting section 17 connected with a bus 10. And the CPU 12 executes operating steps including an encryption, decoding, and erasing of given data which is private data and a release of the lock to the mounted card.

The radio communication section 11 transmits or receives control signals and voice data to or from a radio base station (not shown) via a radio circuit and an antenna and modulates or demodulates them. The CPU 12, which is connected to other components built in the mobile telephone 1 via the bus 10, is a central processing unit for controlling the mobile telephone 1 using software stored in the ROM/RAM 13. The ROM/RAM 13 is a section for storing the software including the above procedure for controlling the mobile telephone 1 and a section for securing a work memory required when the CPU 12 is connected via the bus 10 and executes the software.

The EEPROM 14 is a section for storing private data such as a telephone directory, electronic mails, a schedule, and personal setting information that the user input from the user interface section 15 and it is a non-volatile memory whose data is not erased at power-off. This stored data, however, can be locked, transferred, or erased by a lock release mechanism of the user interface section 15, a lock mechanism of the card mounting section 16, and/or a removal of the SIM card 120, as described later.

The user interface section 15 comprises a liquid crystal display, buttons, and a speaker attached to the mobile telephone 1 and has the lock release mechanism by means of a lock release button, for example. The look release button is operated by the user in order to remove the SIM card 2 mounted on the card mounting section 16 or the external memory 3 mounted on the memory mounting section 17. And the lock release button interfaces with the card mounting section 16 and the memory mounting section 17. The card mounting section 16 is a section for mounting the SIM card 2 by its insertion.

The card mounting section 16 has the lock mechanism of the mounted SIM card 2 in addition to a function enabling the SIM card 2 to be mounted by its insertion. And the card mounting section 16 further has means for reading data from the SIM card 2, means for checking whether the SIM card 2 is mounted, and means for detecting a users inserting action for mounting the card or his/her pulling-out action for removing it. Setting or releasing the lock mechanism can be executed both electronically and mechanically.

However there is a case that the external memory 3 is mounted on the memory mounting section 17 with the SIM card 2 mounted on the card mounting section 16. In this case, the card mounting section 16 locks the SIM card 2 so as to prevent its fall-off electronically or mechanically as long as the external memory 3 is mounted.

The user's action of pulling out the SIM card 2 can be detected by detecting that a lock mechanism of a card arranged in the entrance side shifts perpendicularly by a thickness of the card with a rise in the lock release procedure, for example. The lock mechanism of the card prevents the fall-out of the card in the vicinity of the card slot. After that, the lock mechanism is put in a steady state by removing the card.

The card lock mechanism forms a slope in the card slot side, for example. Due to this structure, the card can be inserted inside with pushing through this lock mechanism. Therefore, the card insertion can be detected with the inserted card when the lock mechanism moves perpendicularly by a thickness of the card.

The memory mounting section 17 is a portion on which the external memory 3 being able to read/write (R/W) is mounted. This memory mounting portion 17 also has means for writing or reading to or from the external memory 3, means for checking whether the external memory 3 is mounted, means for electronically or mechanically locking the external memory 3 so as to prevent its fall-out, and means for detecting a user's action of mounting or removing the external memory 3 in addition to a function enabling the external memory 3 to be mounted. At this point, if the external memory 3 is formed in a card, means for detecting a users action of inserting or pulling out a memory card can be realized in the same method as the detecting method for the card mounting section 16 by using the above lock mechanism.

As set forth in the above, the SIM card 2 is a memory card which contains identification information (ID) equivalent to a telephone number of a subscriber registered as an external memory card for registering a telephone number or the like of the mobile telephone stored as a registered identification code (hereinafter, registered ID) according to the identification code and generally it has a built-in IC chip. The external memory 3 is a memory being read/write (R/W) for storing a content recorded in the EEPROM 14 in an encryption form, for which a non-volatile memory such as an EEPROM is used. The external memory 3 is assumed to be card-shaped like the SIM card 2 as described above.

Figure 3:
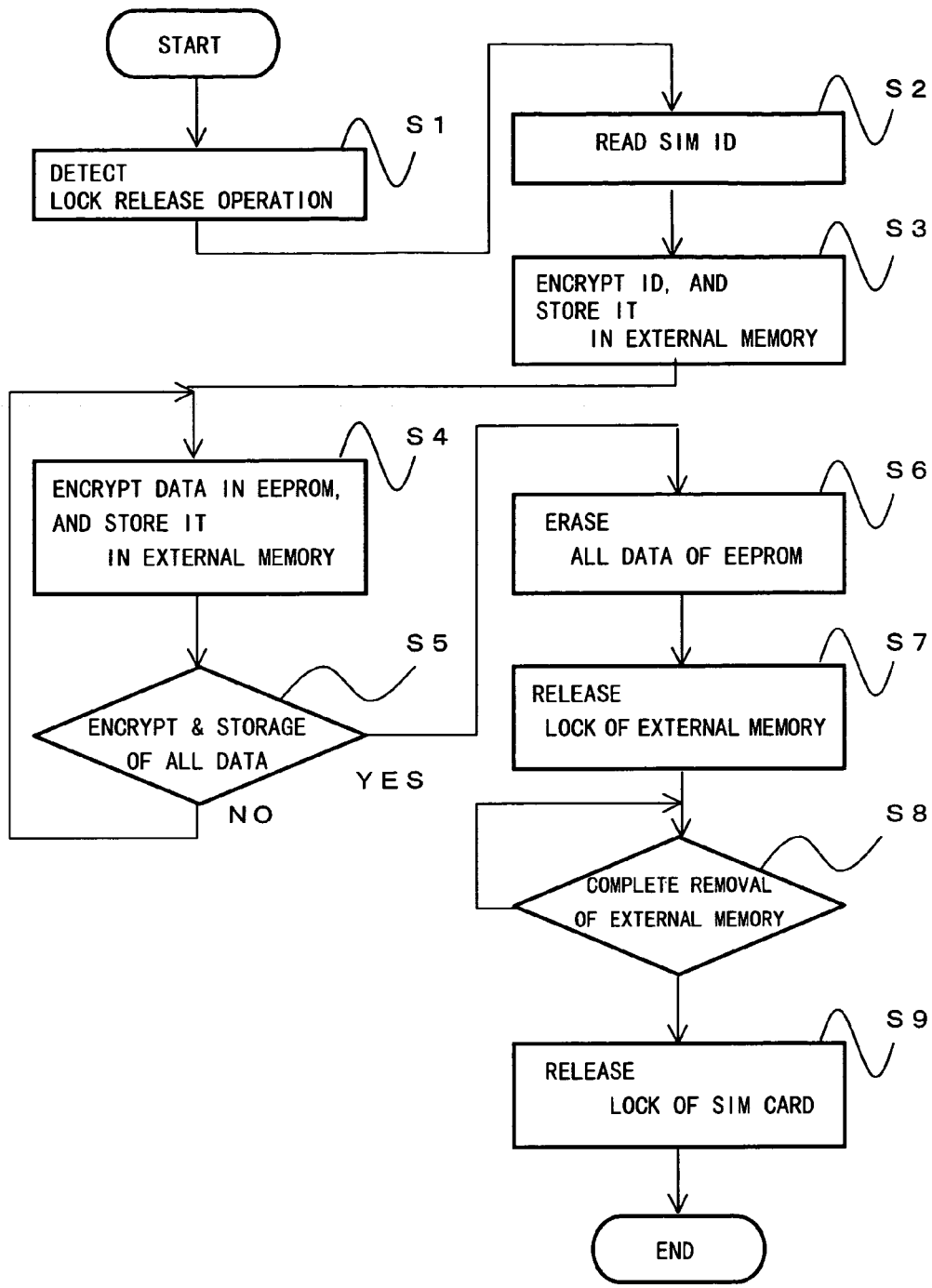
FIG. 3 is a flowchart showing an embodiment of a card pulling-out procedure in FIG. 2.

The following describes an operation procedure for pulling out the mounted SIM card 2 from the mobile telephone 1 with referring to FIG. 3 in addition to FIG. 2.

It is assumed that the SIM card 2 and the external memory 3 are previously mounted on the card mounting section 16 and the memory mounting section 17, respectively, that they are locked to prevent them from being removed, and that a telephone function has been used. In addition, in a given area of the EEPROM 14, the EEPROM 14 has already-stored private data such as a telephone directory, electronic mails, and a schedule registered and set by the user when the mobile telephone 1 is used.

First, if the CPU 12 detects a lock release button of the user interface section 15 (step S1), the CPU 12 reads the registered ID stored in the SIM card 2 (step S2). Subsequently, the CPU 12 encrypts the read registered ID in the encryption procedure by using the registered ID itself as a private key and then writes and stores the encrypted result as an encrypted ID into a given area of the external memory 3 (step S3). If the registered ID used for the encryption is already stored in the ROM/RAM 13, this stored registered ID can be read for use.

For an encryption algorithm in the above, DES (data encryption standard) or other common key system algorithm is used. The registered ID is generally managed by a telephone company on which the subscriber has been registered and it is considered not to be easy to analogize out of a telephone number. Therefore, it can be treated as a private key.

Subsequently, the CPU 12 reads the predetermined size of private data stored in the EEPROM 14, encrypts the read private data using the registered ID read from the SIM card 2 as a private key, and stores the encrypted result into the external memory 3 (step S4). For the encryption algorithm in this step, DES or other common key system algorithm is used, too.

At this point, it is determined whether all the required private data has already been encrypted among data in the EEPROM 27 (step S5) and then the above step S4 and step S5 are repeated until encryption of all the private data is completed. The required data is all the private data related to some privacy such as at least a telephone directory, electronic mails, and a schedule. They include all the private data that has been recorded while the SIM card is used with the SIM card mounted such as data written by the user after inserting the SIM card 2 in the mobile telephone 1, data input by the user at an originating call, and data received by the user from the caller at an incoming call.

When YES is selected in the step S5, the encryption is terminated for all the required private data in the EEPROM 14 and the storage to the external memory 3 is completed. At this time, the CPU 12 erases all the private data related to the privacy such as the telephone directory, electronic mails, and the schedule out of the data in the EEPROM 14 in a data erasing procedure (step S6). The erased data should have already been transferred and stored in the external memory 3.

When the erasing is terminated, the CPU 12 instructs the memory mounting section 17 to release the lock mechanism (step S7), so that it is released in the lock releasing procedure. Subsequently, the CPU 12 determines whether the external memory 3 has been pulled out (step S8). Only when YES is selected in the step S8, which means the pulling out the external memory 3 is completed, the CPU 12 instructs the card mounting section 16 to release the lock mechanism (step S9), so that it is released in the lock release procedure.

The card mounting section 16 can be electronically released from the lock as described above or it can be mechanically released from the lock only after a removal of the external memory 3 interfacing with the memory mounting section 17.

While a display of the mobile telephone is not described in the above explanation, it is possible to make a predetermined indication such as, for example, a lamp indicator or a screen display for information of "Under release operation" from step S1 to step S9.

According to the above procedure, the user of this mobile telephone can pull out the SIM card after automatically erasing private data written into the mobile telephone during use thereof, thereby preventing the private information from being viewed by someone else. Furthermore, erased data is recorded and stored in the external memory before erasing the data, by which the recorded data can be reused. When the SIM card is used next time, another mobile telephone can be used in the same manner as for using the previous mobile telephone. In addition, the copied data is encrypted and therefore, even if the external memory is passed to anyone else, it is possible to prevent the content from being read by him/her only if it is separated from the SIM card.

Figure 4:
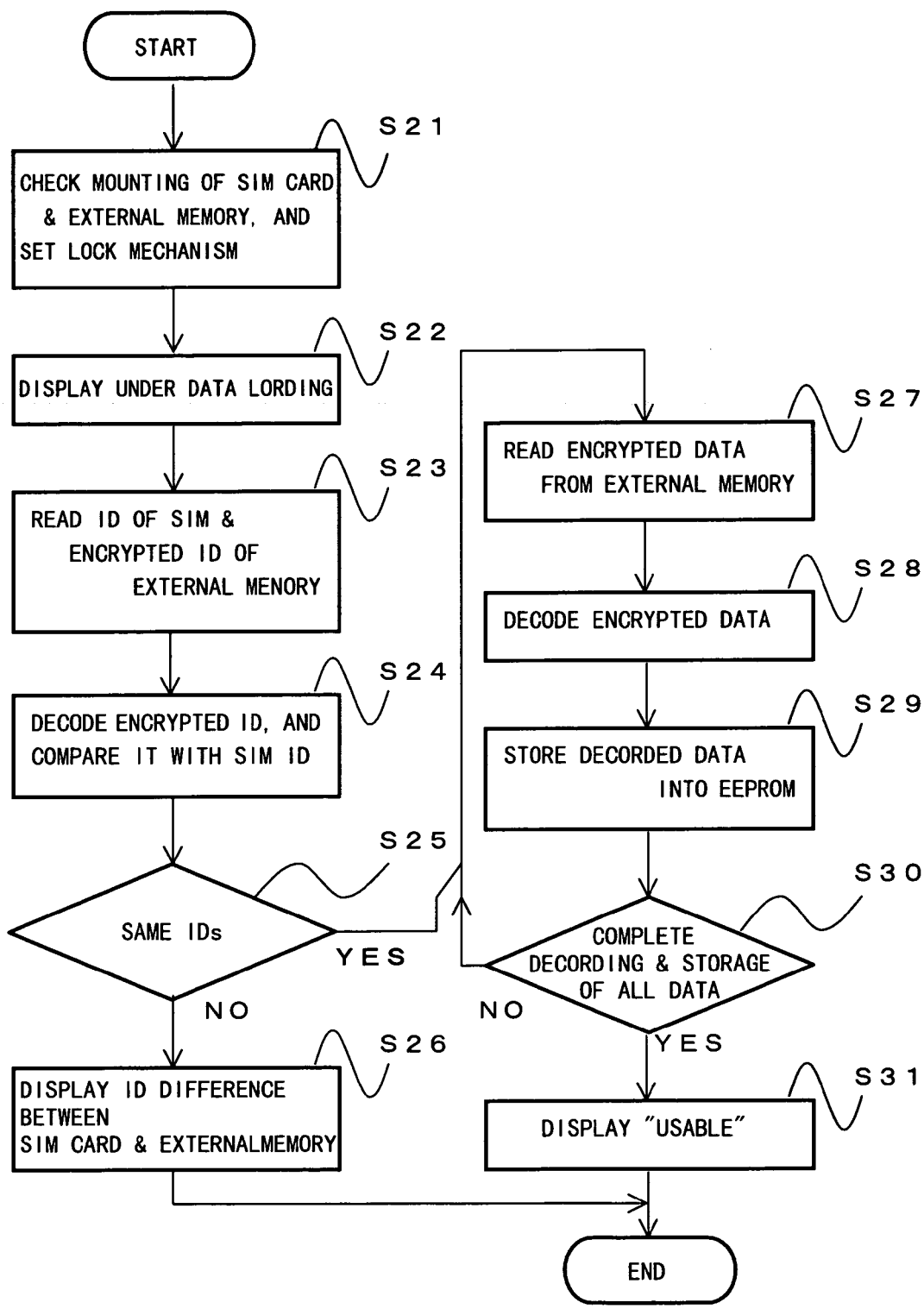
FIG. 4 is a flowchart showing an embodiment of a card mounting procedure in FIG. 2.

The following describes an operation procedure for mounting the SIM card 2 on the mobile telephone 1 by referring to FIG. 4 in addition to FIG. 2. It is assumed that the external memory 3 contains recorded and stored encrypted data, which has been used before as described above.

First, both of the SIM card 2 and the external memory 3 are checked that they are mounted on the card mounting section 16 and the memory mounting section 17, respectively. At this time, the CPU 12 sets the lock mechanism of the card mounting section 16 and that of the memory mounting section 17 to lock (step S21) and indicates that data is under download (step S22). The setting of the lock mechanism of the card mounting section 16 can be electronically controlled or mechanically controlled interfacing with the memory mounting section 17.

Next, the CPU 12 gets the registered ID stored in the SIM card 2 therefrom and reads the encrypted ID stored from a given place of the external memory 3 (step S23). This encrypted ID is an encrypted form of the registered ID which has been stored in the SIM card 2 mounted on the mobile telephone 1 at pulling out the mounted SIM card 2 and the external memory 3.

Next, the encrypted ID is decoded in a decoding procedure by using the registered ID of the SIM card 2 mounted this time and the decoded ID is compared with the registered ID stored in the SIM card 2 (step S24). It should be noted that, however, an algorithm for decoding must be a decoding algorithm corresponding to the algorithm for the encryption.

Unless NO is selected as a comparison result between them (step S25), in other words, unless the decoded ID matches the registered ID, it means that the SIM card at the encryption timing differs from the currently inserted SIM card. Therefore, the CPU 12 instructs the user interface section 15 to indicate that a different SIM card is inserted (step S26).

If YES is selected as a result of step S25, in other words, if both of the IDs match, the CPU 12 reads a predetermined size of encrypted data from the external memory 3 (step S27). It decodes the encrypted data by using the registered ID stored in the SIM card 2 (step S28). And it stores the resulted decoded data into the EEPROM 14 (step S29).

It is checked that all data stored in the external memory 3 has been decoded (step S30). If YES is selected since all data has been decoded, the CPU 12 displays a standard screen indicating that the mobile telephone 1 can be used (step S31) and notifies the user of it. In other words, the EEPROM 14 resumes the private data such as a telephone directory, electronic mails, and a schedule in the state of the previous mobile telephone. And therefore the owner of the SIM card 2 can use the mobile telephone 1 in the same manner as before continuously to the previous time.

If NO is selected in step S30, in other words, unless all data is not completely decoded, the control returns to step S27 and the procedure is repeated until YES is selected in step S30 in which all data is decoded and stored completely.

While the encrypted data is recorded in the external memory in the above description, if there is no recorded data, the procedure from step S27 to step S30 is omitted and the control directly proceeds from YES in step S25 to step S30. Furthermore, while downloading is indicated by a screen display, it can be indicated by lightening of a predetermined LED indicator.

Figure 5:
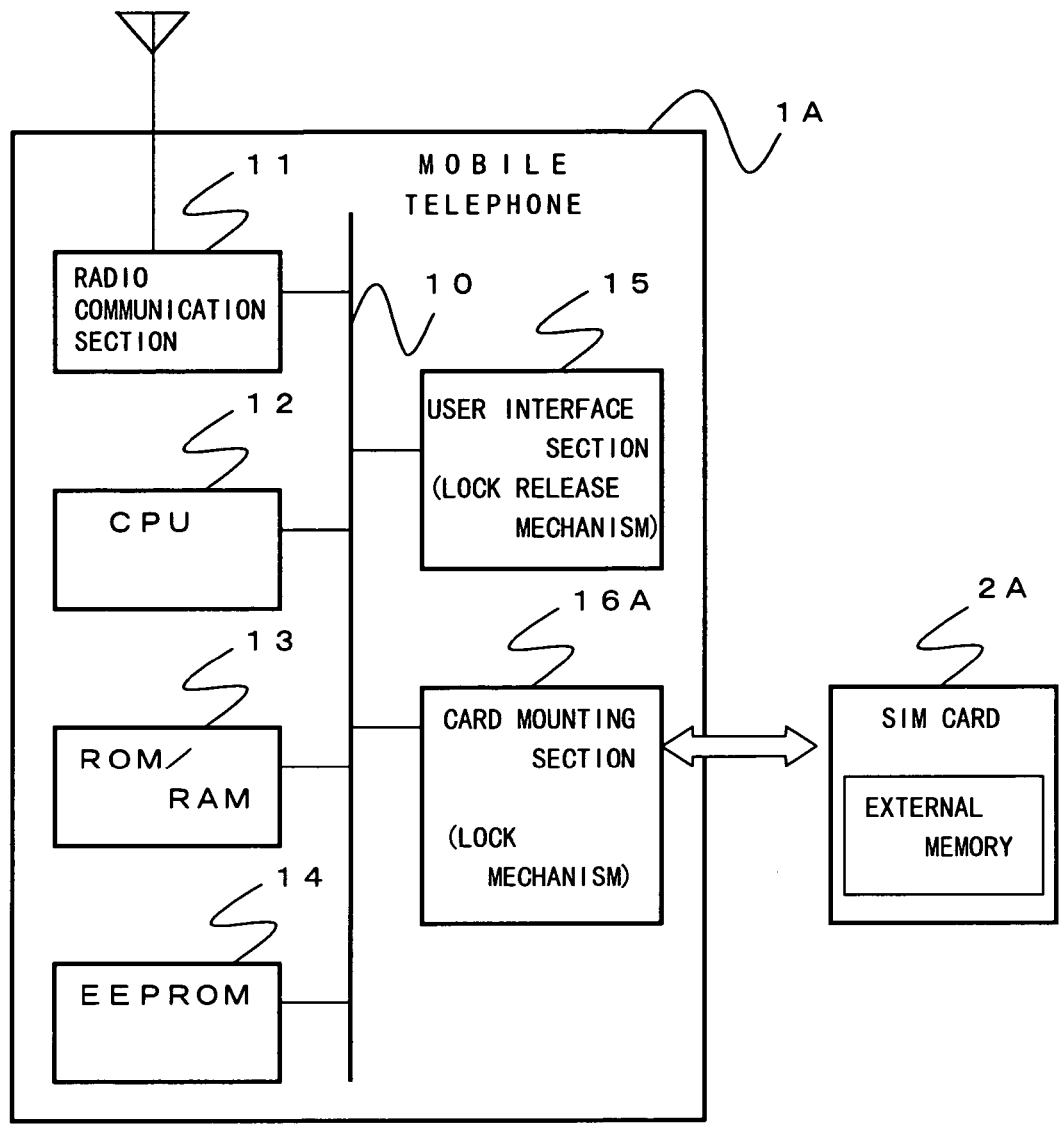
FIG. 5 is a functional block diagram showing an embodiment according to the present invention other than the embodiment in FIG. 2.

The following describes a use of the SIM card 2A containing the external memory for the mobile telephone 1A by referring to FIG. 5 in addition to FIG. 2.

The mobile telephone 1A shown in FIG. 5 differs from the mobile telephone 1 in FIG. 2 in that a function of the memory mounting section 17 is included in the card mounting section 16A. In other words, in the description in FIG. 2, the memory mounting section 17 can be replaced with the card mounting section 16A. Therefore, the operating procedure of the CPU 12 can be the same as the above. In this configuration, both of the SIM card and the external memory can be checked only by a confirmation of the SIM card at their insertion or removal.

The following describes an embodiment in which a memory mounted on a server of a network is used as an external memory by referring to FIGS. 5 to 8.

Figure 6:
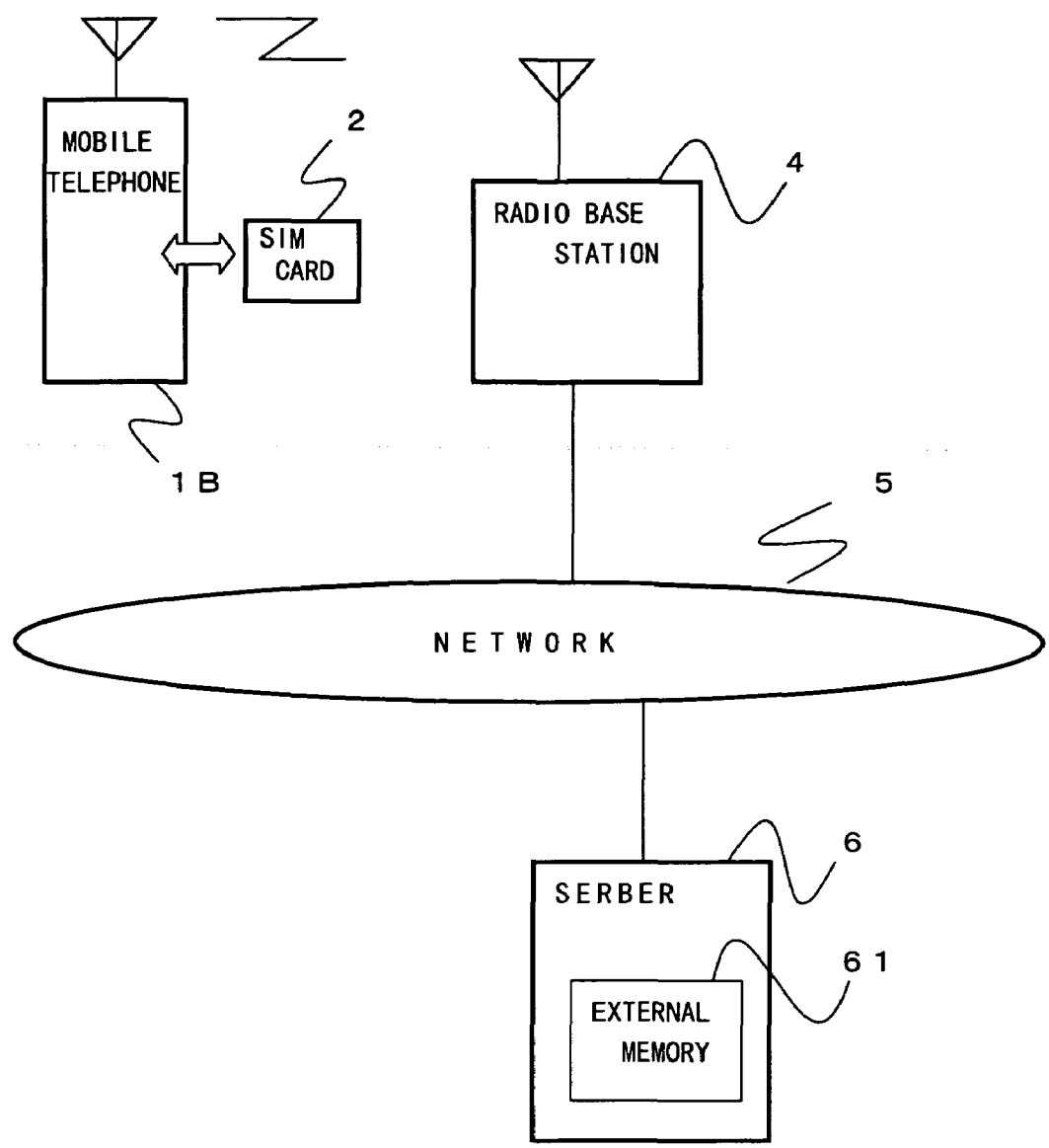
FIG. 6 is a network connection diagram showing an embodiment according to the present invention.

As shown in FIG. 6, in the mobile telephone service, a mobile telephone 1B is connected to a radio base station 4 via a radio circuit and the radio base station 4 can access a server 6 via a network 5. The mobile telephone 1B can be used after mounting an SIM card 2. The server 6 contains an external memory 61 for storing and private data. Where the private data is stored is assumed to be predetermined, for example for each registered user.

Figure 7:
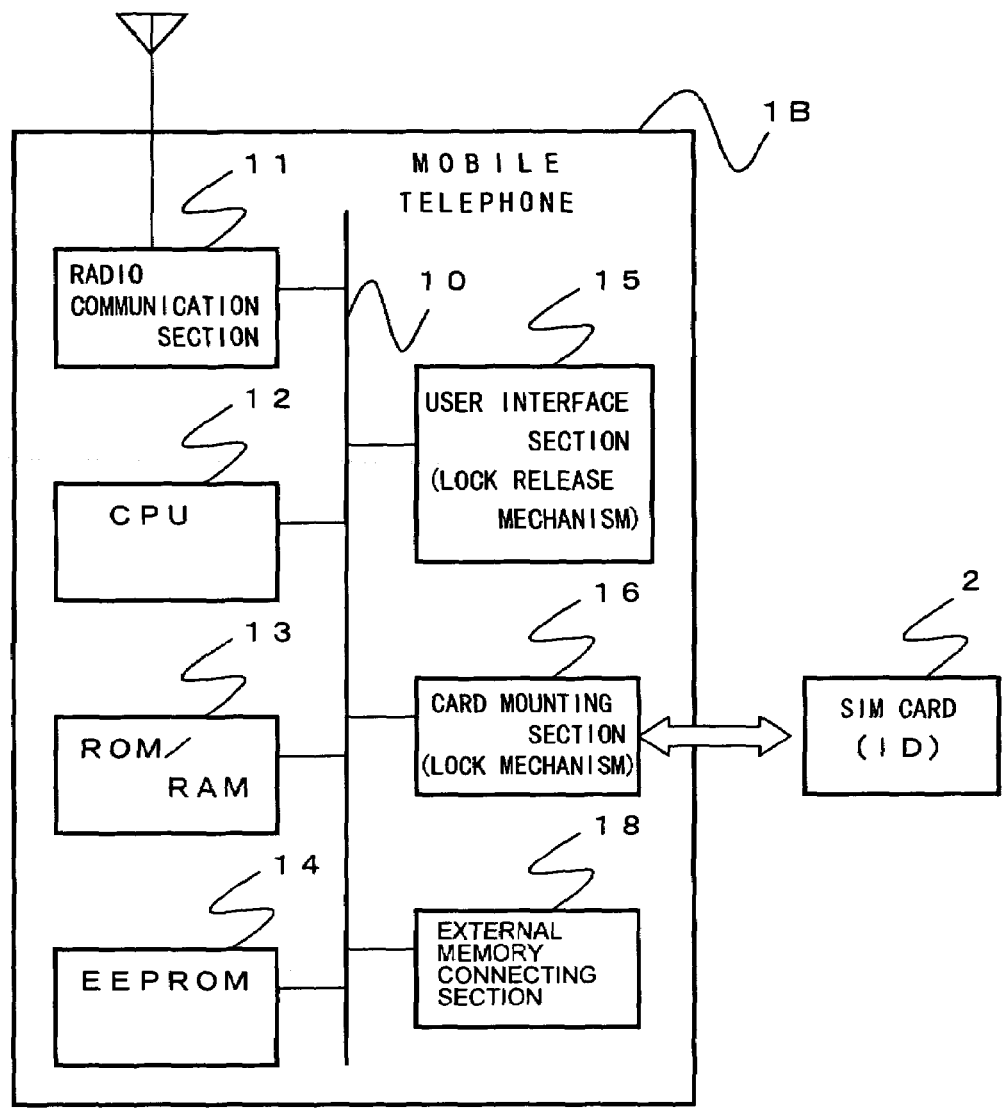
FIG. 7 is a functional block diagram showing an embodiment according to the present invention used for FIG. 6.

Referring to FIG. 7, there is shown a configuration of the mobile telephone 1B. It differs from the mobile telephone 1 in FIG. 2 in that it has an external memory connecting section 18 instead of the memory mounting section 17. While the external memory connecting section 18 is shown as a matter of convenience for the explanation here, the CPU 12 can execute this connecting procedure by adding the procedure to a ROM/RAM program and therefore a hardware addition can be unnecessary.

Next, by referring to FIG. 8, an operation procedure is described below for pulling out a mounted SIM card 2 after a use of the mobile telephone 1B. It is assumed, however, that the SIM card 2 is previously mounted on the card mounting section 16 with being locked by a lock mechanism to prevent its removal and that a telephone function has been used. Therefore, it is assumed that the EEPROM 14 stores private data such as a telephone directory, electronic mails, and a schedule registered by the user when using the mobile telephone 1B.

As shown, the CPU 12 detects an operation of a lock release button of a user interface section 15 (step S41). Then, the CPU 12 reads and encrypts a registered ID stored in the SIM card 2 (step S42) so as to be an encrypted ID by using the registered ID itself as private key.

Subsequently, the CPU 12 accesses the external memory connecting section 18 so as to be connected to an external memory 61 of the server 6 via the network 5 from the radio base station 4 (step S43) and first sends an encrypted ID (step S44). The server 6 stores the encrypted ID, which has been received, to a given area of the external memory 61.

Next, the CPU 12 reads a predetermined size of private data stored in the EEPROM 14. And it encrypts the read private data using the registered ID, which has been read from the SIM card 2, as a private key, and transfers a result of the encryption to the external memory 61 (step S45). Therefore, the server 6 stores the encrypted data which has been received into the above given area of the external memory 61.

At this point, the CPU 12 determines whether all the required private data is encrypted and transferred among data in the EEPROM 17 (step S46) and repeats steps S45 and S46 in the above until all encrypted data is transferred.

It will be taken up that YES is selected in step S46 or all required private data in the EEPROM 14 is completely encrypted and transferred and a storage to the external memory 51 is completed. In this case, the CPU 12 releases the server 6 of the network 5 connected via the radio base station 4 by the external memory connecting section 18 (step S47).

On the other hand, the CPU 12 erases all the transferred private data related to privacy in the above such as a telephone directory, electronic mails, and a schedule among data in the EEPROM 14 (step S48).

At a completion of the erasing, the CPU 12 releases the lock mechanism by instructing the memory mounting section 17 (step S49) to terminate the procedure.

During a period of this procedure, a predetermined indication of "Under release operation" can be made for the user.

According to the above procedure, the user of this mobile telephone can pull out the SIM card after the erasing of the private data stored in the mobile telephone for its use, by which the private information can be prevented from being viewed by someone else. Furthermore, the private data can be reused by recording the private data to be erased into the external memory before it is erased. And therefore, at the next time use of the SIM card, the user can use another mobile telephone in the same manner as for using the previous mobile telephone without reentering the private data.

Figure 8:
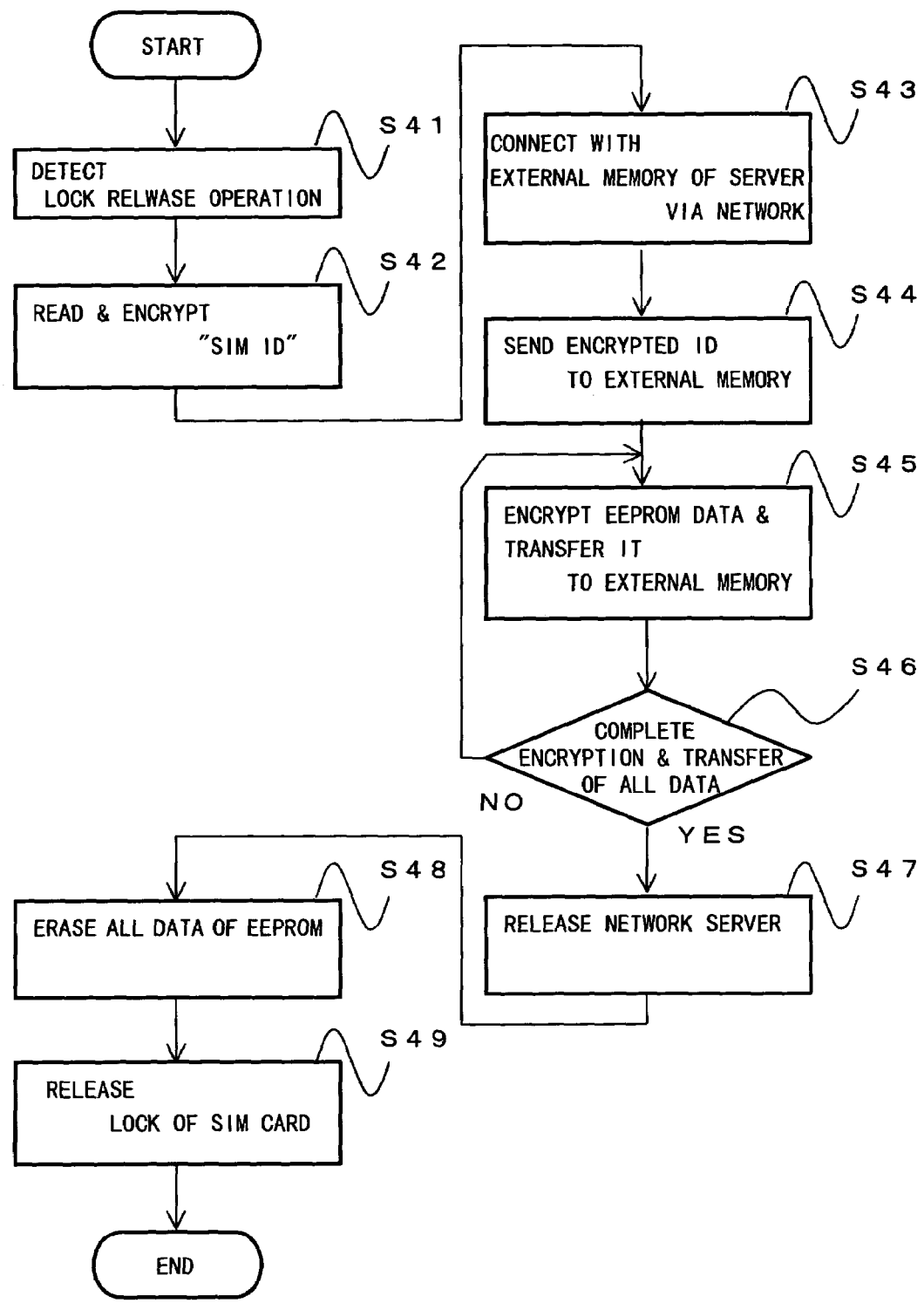
FIG. 8 is a flowchart showing an embodiment of a card pulling-out procedure in FIG. 7.
Figure 9:
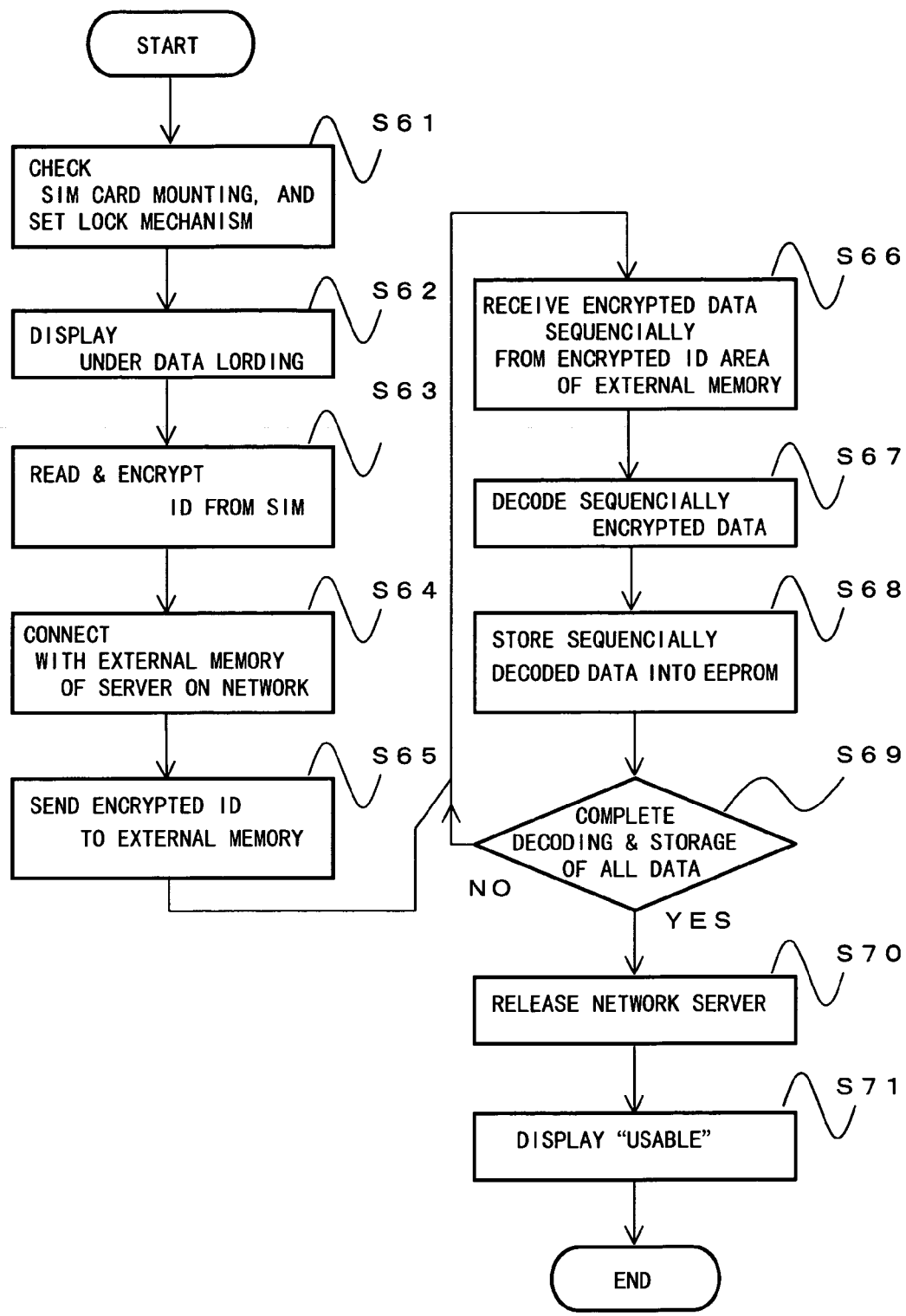
FIG. 9 is a flowchart showing an embodiment of a card mounting procedure in FIG. 7.

The following describes an operating procedure when the SIM card 2 is mounted on the mobile telephone 1B by referring to FIGS. 5 and 8 in addition to FIG. 7. It is assumed that the private data having been used is recorded as encrypted data in the external memory 61 as described above.

First, when it is checked that the SIM card 2 is mounted on the card mounting section 16, the CPU 12 sets the lock mechanism of the card mounting section 16 to a locked state (step S61) and indicates that data is under downloading (step S62). The lock mechanism of the card mounting section 16 can be set with either an electronic control or a mechanical control.

Next, the CPU 12 reads the registered ID stored in the SIM card 2 therefrom and encrypts the registered ID (step S63) to generate an encrypted ID.

Subsequently, the CPU 12 accesses the external memory connecting section 18 so as to be connected to the external memory 61 of the server 6 via the network 5 from the radio base station 4 (step S64) and first sends the above encrypted ID (step S65). The server 6 searches the external memory 61 for an area where the encrypted ID that has been received is stored, reads a predetermined size of data among encrypted data stored in this area, and returns it to the mobile telephone 1B.

In the mobile telephone 1B, the CPU 12 receives the encrypted data from the external memory 61 (step S66), sequentially decodes the encrypted data by using the registered ID of the SIM card 2 mounted this time (step S67), and sequentially stores the result into the EEPROM 14 (step S68).

The CPU 12 examines whether all the encrypted data stored in the external memory 61 has been decoded via the server 6 (step S69). It will be taken up that YES is selected in the step s69 or all the encrypted data has been completely decoded. In this case, the CPU 12 releases the server 6 of the network 5 connected via the radio base station 4 by the external memory connecting section 18 (step S70) and displays a standard screen indicating that the mobile telephone 1B can be used (step S71) to inform the user thereof.

In other words, the EEPROM 14 resumes the private data such as a telephone directory, electronic mails, and a schedule in the state of the previous mobile telephone, and therefore the owner of the SIM card 2 can use the same private data as before continuously to the previous time.

It will be taken up that NO is selected in the above step S69 or all the encrypted data has not been completely decoded or stored yet. In the case, the control returns to the above step S66 and the procedure is repeated until YES is selected in step S69 in which all the encrypted data has been completely decoded and stored.

While the encrypted data has already been recorded in the external memory in the above description, a procedure from the above steps S66 to S69 is omitted and the control proceeds directly from step 65 to step S70 if there is no recorded data.

Figure 10:
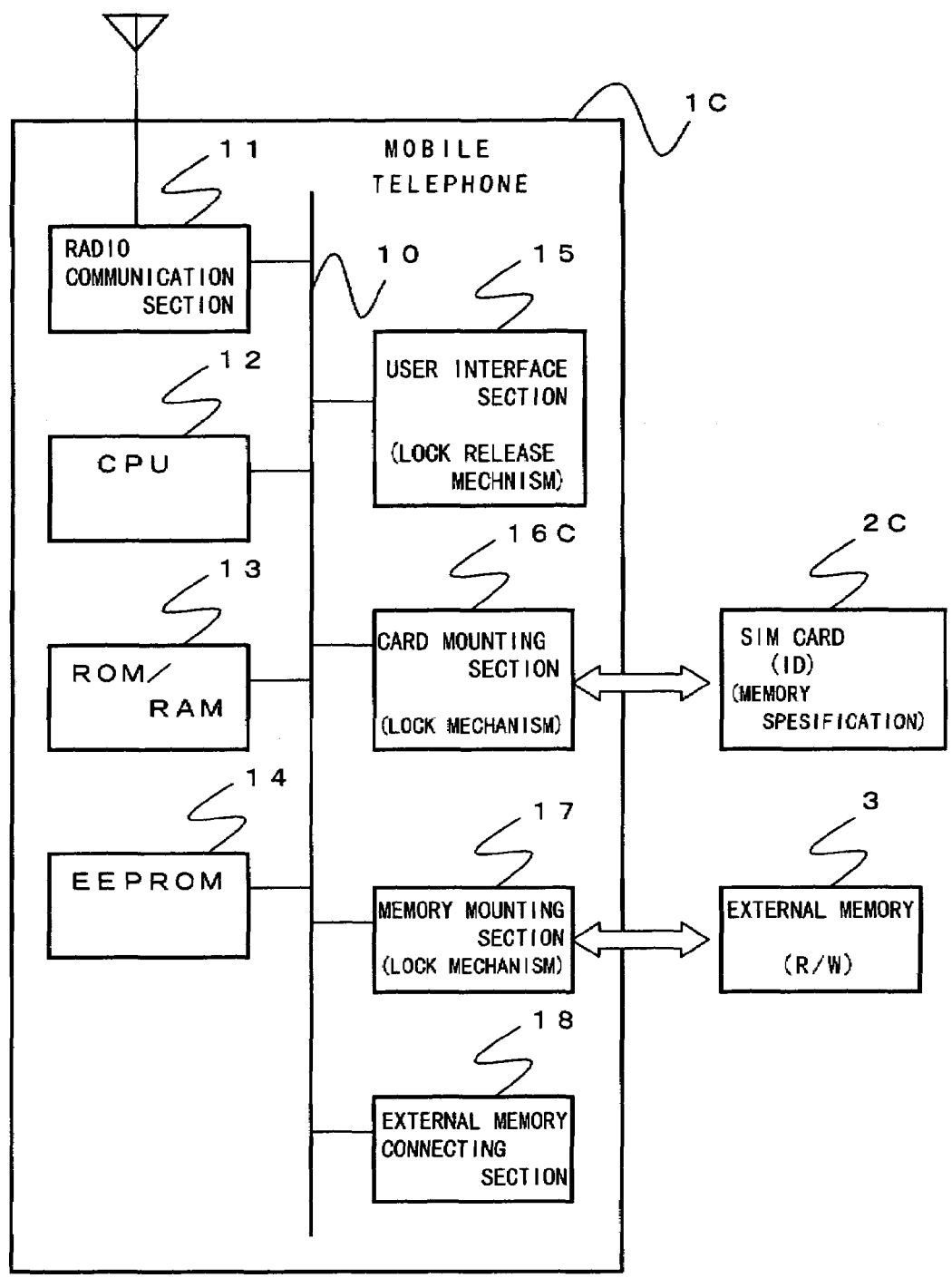
FIG. 10 is a functional block diagram showing an embodiment according to the present invention other than those in FIG. 2, FIG. 5, and FIG. 7.

The following describes an embodiment other than those of FIG. 2 and FIG. 7 by referring to FIG. 10. The differences from the above embodiments are a mobile telephone IC, an SIM card 2C, and a card mounting section 16C in FIG. 10.

The shown mobile telephone 1C is an incorporation of the mobile telephone 1 shown in FIG. 2 with the mobile telephone 1B shown in FIG. 7. The SIM card 2C has a specification of an external memory for storing an encrypted ID and encrypted private data. In other words, the user carries the SIM card 2C under one of contracts for using a card-type external memory 3 and for using an external memory 61 of the server 6 as a subscriber. The card mounting section 16C has means for reading the specification of the external memory from the mounted SIM card 2C in addition to the facilities of the above components having the same names. Therefore, the CPU 12 can store private data by using the external memory specified by the SIM card 2C.

It was described that the private data recorded in the EEPROM is transferred and stored only into a single external memory such as a card-typed single insertion memory, a large-sized memory of a server via a network, or a built-in memory to the SIM in the above description. However, it is possible to use a configuration having all the external memories in the above, where they are sequentially selected based on a given order. For example, the procedure can be such that the above encrypted private data is stored first in the built-in memory of the SIM card and then an excess in the capacity is stored in the server memory with an encrypted ID.

While the shown functional blocks and procedures are referenced in the above description, any alteration in a distribution with a functional separation or incorporation or in a replacement in the order of steps is permitted only if the above functions are satisfied. Accordingly, the present invention is not limited by the above description and further it is applicable to the whole field of mobile telephones.

As set forth herein above, the present invention provides the following effects.

The first effect is that private data recorded inside for use can be prevented from being viewed by someone when a mobile telephone used with an SIM card is passed to someone else. It is because all the private data inside the mobile telephone is erased before pulling out the SIM card from the mobile telephone.

The second effect is that an exchange of the mobile telephone for use is easy since an external memory is prepared. It is because inside private data is copied to the external memory connected to the mobile telephone. Therefore, before using a mobile telephone other than the mobile telephone having been used, the private data in the external memory can be moved to the new mobile telephone.

The third effect is that the private data stored in the external memory can be prevented from being viewed by someone. Therefore, the external memory can be attached within a computer or a server on the network to which the mobile telephone is connectable. In addition, even if any other person holds a mobile telephone insertion-type external memory, the data can be prevented from being viewed by the person. It is because the private data and the registered ID are encrypted before the private data is stored in the external memory.

What is claimed is:

1. A mobile telephone, comprising:
a CPU;
an internal memory in which data is stored; and
a removable subscriber card on which an identification code is stored;
a lock mechanism which prevents the removal of the subscriber card; and
a lock release mechanism which disengages the lock mechanism, thereby enabling the removal of the subscriber card from the mobile telephone;
wherein, upon the detection of a lock release instruction for the subscriber card from a user, the CPU first erases data stored in the internal memory and then enables the lock release mechanism when the data erasing has been completed.

2. A mobile telephone, comprising:
a CPU;
an internal memory in which data is stored;
a removable subscriber card on which an identification code is stored;
a lock mechanism which prevents the subscriber card from falling out of the mobile telephone; and
a lock release mechanism which disengages the lock mechanism, thereby enabling the removal of the subscriber card from the mobile telephone;
wherein, upon the detection of a lock release instruction for the subscriber card from a user, the CPU first transfers data stored in the internal memory to an external memory, such that the transferred data is erased from the internal memory, and upon the completion of the data transfer, enables the lock release mechanism.

3. A mobile telephone according to claim 2, wherein the data stored in the internal memory is encrypted, using the identification codes stored on the subscriber card, before the data is transferred to the external memory.

4. A mobile telephone according to claim 2, wherein:
the data stored in the internal memory is encrypted, using the identification code stored on the subscriber card, before the data is transferred to the external memory; and
when a new subscriber card is inserted into the mobile phone, the use of the new subscriber card is only permitted when the identification code stored on the new subscriber card is the same as the identification code with which the data on the was encrypted.

5. A mobile telephone according to claim 2, wherein:
the data stored in the internal memory is encrypted, using the identification code stored in the subscriber card, before the data is transferred to the external memory; and
when the external memory is re-inserted into the mobile phone, the encrypted data stored thereon is transferred to the internal memory using the identification codes stored on the subscriber card, such that the encrypted data stored on the external memory is only decrypted and transferred to the internal memory when the identification code on the subscriber card is the same as the identification code with which the data was encrypted.

6. A mobile telephone according to claim 2,
wherein the external memory is embodied on a removable card; and
wherein the mobile telephone further comprises:
a first lock mechanism which prevents the removal of the subscriber card;
a second lock mechanism which prevents the removal of the external memory; and
means for detecting the inserting and removal of the subscriber card and the external memory; and
wherein the CPU controls the first lock mechanism and the second lock mechanism such that the first lock mechanism is released, permitting the removal of the subscriber card, after the second lock mechanism is released and the removal of the external memory has been detected.

7. A mobile telephone according to claim 2, wherein the external memory is comprised on the subscriber card.

8. A mobile telephone according to claim 2, wherein the external memory is comprised on a server of a network to which the mobile telephone is connectable.

9. A mobile telephone according to claim 2, wherein:
the external memory is comprised in at least one of
the subscriber card,
a dedicated memory medium directly mounted on the mobile telephone, and
a server of a network to which the mobile telephone is connectable; and
the CPU transfers data from the internal memory to the external memory in a pre-determined order.

* * * * *